(12) United States Patent
Thiebaut et al.

(10) Patent No.: US 11,572,522 B2
(45) Date of Patent: Feb. 7, 2023

(54) DINUCLEAR MOLYBDENUM COMPLEX AND USE OF SAME IN LUBRICATING COMPOSITIONS

(71) Applicants: TOTAL MARKETING SERVICES, Puteaux (FR); Centre national de la recherche scientifique, Paris (FR); ECOLE CENTRALE DE LYON, Ecully (FR); Université Claude Bernard Lyon 1, Villeurbanne (FR)

(72) Inventors: Benoît Thiebaut, Lyons (FR); Catherine Charrin, Messimy (FR); Camella Oumahi, Gif sur Yvette (FR); Maria Isabel De Barros Bouchet, Ecully (FR); Pavel Afanasiev, Decines Charpieu (FR)

(73) Assignees: TOTAL MARKETING SERVICES, Puteaux (FR); Centre national de la recherche scientifique, Paris (FR); ECOLE CENTRALE DE LYON, Ecully (FR); Université Claude Bernard Lyon 1, Villeurbanne (FR)

( * ) Notice: Subject to any disclaimer, the term of this patent is extended or adjusted under 35 U.S.C. 154(b) by 0 days.

(21) Appl. No.: 17/424,999

(22) PCT Filed: Jan. 21, 2020

(86) PCT No.: PCT/EP2020/051364
§ 371 (c)(1),
(2) Date: Jul. 22, 2021

(87) PCT Pub. No.: WO2020/152137
PCT Pub. Date: Jul. 30, 2020

(65) Prior Publication Data
US 2022/0089966 A1 Mar. 24, 2022

(30) Foreign Application Priority Data

Jan. 22, 2019 (FR) ...................... 19 00546

(51) Int. Cl.
*C10M 159/18* (2006.01)
*C10M 133/08* (2006.01)
(Continued)

(52) U.S. Cl.
CPC ......... *C10M 133/08* (2013.01); *C07F 11/005* (2013.01); *C10M 137/10* (2013.01);
(Continued)

(58) Field of Classification Search
CPC .............. C10M 133/08; C10M 137/10; C10M 141/10; C10M 169/04; C10M 2203/003;
(Continued)

(56) References Cited

U.S. PATENT DOCUMENTS

| 4,889,647 A | 12/1989 | Rowan et al. |
| 5,412,130 A | 5/1995 | Karol |

(Continued)

FOREIGN PATENT DOCUMENTS

| EP | 0 546 357 A1 | 6/1993 |
| EP | 0 719 851 A2 | 7/1996 |

(Continued)

OTHER PUBLICATIONS

Rapport De Recherche Internationale issued in corresponding International Patent Application No. PCT/EP2020/051364 dated Mar. 16, 2020.
(Continued)

*Primary Examiner* — Prem C Singh
*Assistant Examiner* — Francis C Campanell
(74) *Attorney, Agent, or Firm* — Troutman Pepper Hamilton Sanders LLP

(57) ABSTRACT

The present invention relates to a dinuclear molybdenum complex with ligands selected from fatty tertiary amines of formula (I):

(Continued)

wherein
R represents a linear or branched alkyl comprising 3 to 30 carbon atoms, preferably 3 to 20, advantageously 7 to 17 carbon atoms; n, identical or different, represents 2 or 3;

$R^2$ and $R^3$, identical or different, represent an O, OR, $NR'_2$, COOR', or COO group, where R', identical or different, represents a hydrogen atom or an alkaline or alkaline earth metal, preferably R' is H, preferably $R^2$ and $R^3$, identical or different, represent an OH or $NH_2$ group.

18 Claims, 1 Drawing Sheet

(51) Int. Cl.
*C07F 11/00* (2006.01)
*C10M 137/10* (2006.01)
*C10M 141/10* (2006.01)
*C10M 169/04* (2006.01)
*C10N 30/06* (2006.01)
*C10N 40/25* (2006.01)

(52) U.S. Cl.
CPC ........ *C10M 141/10* (2013.01); *C10M 169/04* (2013.01); *C10M 2203/003* (2013.01); *C10M 2215/26* (2013.01); *C10M 2223/045* (2013.01); *C10N 2030/06* (2013.01); *C10N 2040/25* (2013.01)

(58) Field of Classification Search
CPC ........ C10M 2215/26; C10M 2223/045; C07F 11/005; C10N 2030/06; C10N 2040/25
See application file for complete search history.

(56) References Cited

U.S. PATENT DOCUMENTS

| | | | |
|---|---|---|---|
| 6,329,327 B1* | 12/2001 | Tanaka | C10M 159/18 508/371 |
| 2003/0022954 A1 | 1/2003 | Masawaki | |
| 2007/0073073 A1* | 3/2007 | Gershon | C07F 11/005 556/57 |

FOREIGN PATENT DOCUMENTS

| | | |
|---|---|---|
| EP | 0 743 354 A1 | 11/1996 |
| EP | 0 757 093 A1 | 2/1997 |
| EP | 1 0137 49 A2 | 6/2000 |
| EP | 1 770 153 A1 | 4/2007 |
| WO | 98/26030 A1 | 6/1998 |

OTHER PUBLICATIONS

Rapport De Recherche Prèliminaire issued in corresponding French Application No. 1900546 dated Nov. 11, 2019.
Database Caplus [Online] Chemical Abstract Service, Columbus, Ohio, US; 2015; XP002795535 cited in ISR and FR SR.
Database CA [Online] Chemical Abstract Service, Columbus, Ohio, US; 1994, XP002795536 cited in ISR and FR SR.
Database Caplus [Online] Chemical Abstract Service, Columbus, Ohio, US; 1974 XP002795537 cited in ISR and FR SR.
Database Caplus [Online] Chemical Abstract Service, Columbus, Ohio, US; 1991 XP002795538 cited in ISR and FR SR.

* cited by examiner

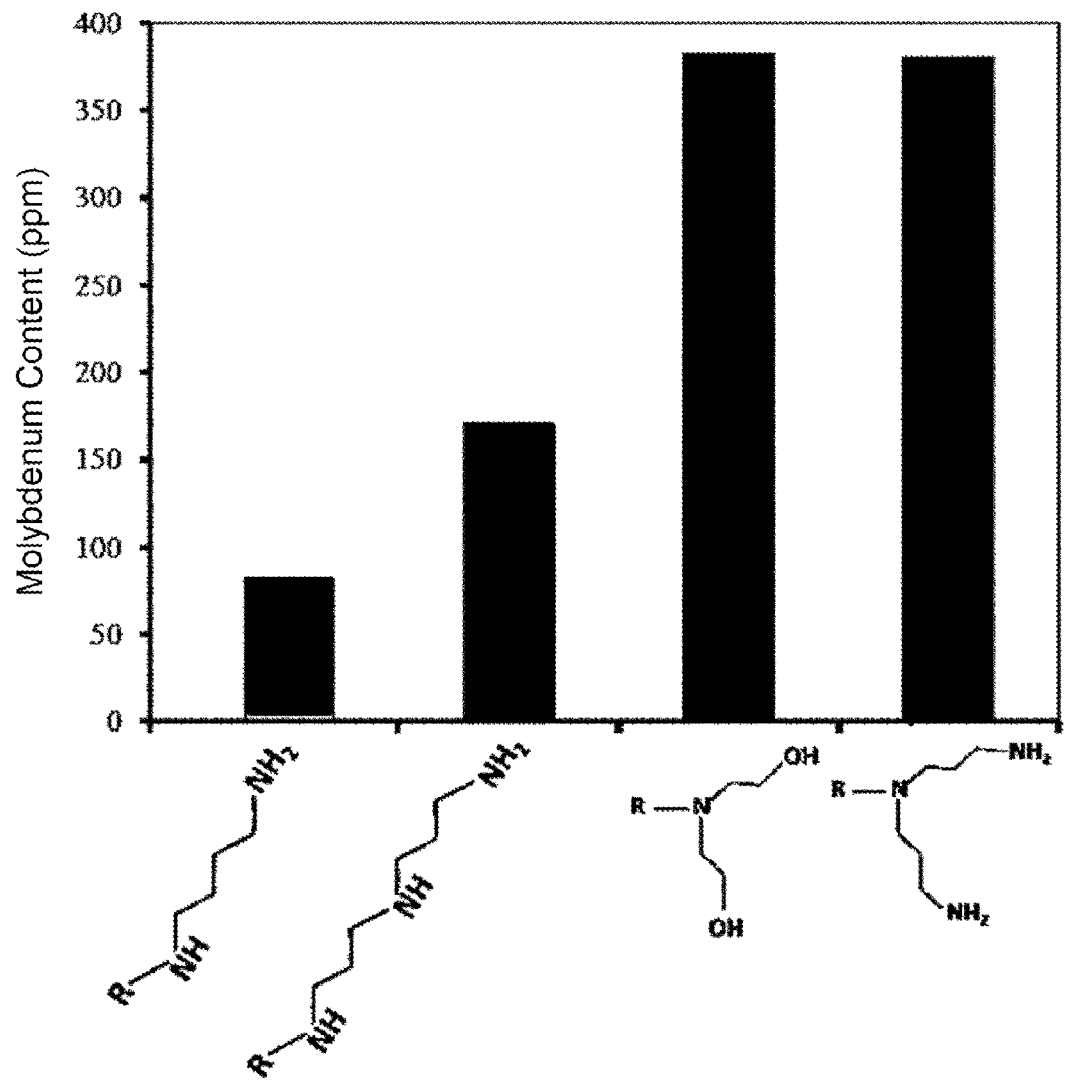

DINUCLEAR MOLYBDENUM COMPLEX AND USE OF SAME IN LUBRICATING COMPOSITIONS

CROSS REFERENCE TO RELATED APPLICATIONS

The present application is a U.S. National Phase Application under 35 U.S.C. § 371 of International Patent Application No. PCT/EP2020/051364 filed Jan. 21, 2020, which claims priority of French Patent Application No. 19 00546 filed Jan. 22, 2019. The entire contents of which are hereby incorporated by reference.

FIELD OF THE INVENTION

The present invention relates to the field of lubricating compositions, in particular pertaining to the fuel economy (FE or fuel eco) properties of the lubricating compositions and the resistance to friction or abrasion. More specifically, the invention relates to a dinuclear molybdenum complex for enhancing the fuel economy properties of a lubricating composition comprising at least one base oil.

BACKGROUND

Developments in engines and the performance elements of lubricating compositions for engines are inextricably linked. The conditions of use for gasoline and diesel engines include both extremely short trips as well as long routes. Indeed, 80% of car trips in Western Europe are less than 12 kilometers whereas annual mileage covered by vehicles goes up to 300,000 km.

Lubricating compositions for motor vehicles should be adaptable to all of these conditions of use and thus should have improved properties and performance characteristics.

Lubricating compositions for engines must therefore fulfill numerous objectives.

The lubrication of the parts that slide over one another plays a decisive role, in particular in reducing the friction between these parts and consequently the wear and tear thereof, thus in particular making it possible to save fuel.

An essential requirement of lubricating compositions for engines relates to environmental aspects. It has indeed become essential to reduce fuel consumption in order to reduce $CO_2$ emissions.

The nature of the lubricating compositions for motor vehicles has an impact on the fuel consumption. Lubricating compositions for motor vehicles that help save fuel are often referred to as fuel economy (FE) lubricants.

It is constantly sought to achieve improvement in the levels of FE (fuel eco) related performance in the formulation of automotive lubricants.

To this end it is known practice to add friction modifiers such as organomolybdenum compounds to lubricating compositions in order to lower the coefficient of friction. The addition of such compounds in particular serves to enable fuel savings and thus confers the lubricant with FE properties. When the engine is running, the organomolybdenum compound forms in particular $MoS_2$ (lamellar molybdenum disulphide) which allows friction to be reduced.

Organomolybdenum compounds containing sulfur are fragile and can be degraded by external chemical or thermal phenomena such as oxidation, hydrolysis, thermal decomposition, and side reactions with other additives. The compounds or the degradation products thereof may also precipitate and lose the Fuel Eco performance of the lubricating composition (and therefore fuel savings) over time or cause cleanliness or corrosion related problems.

In order to remedy this problem, it is possible to make use of organic friction modifiers which are, however, less effective. An increase in the amount of organomolybdenum compound has also been considered, however, this can lead to a risk of engine fouling and/or copper corrosion as well as a significant increase in the cost of formulation of the lubricating composition.

There is therefore a need to have lubricating compositions for engines, in particular for a vehicle engine, which make it possible to provide a solution to all or part of the problems faced with lubricating compositions of the state of the art. In particular, there is a need for a stabilized organomolybdenum compound which does not present problems of precipitation or degradation and loss of performance.

SUMMARY

One objective of the present invention is to provide a stabilized molybdenum complex which in particular does not present a problem of precipitation or degradation due to various different external chemical or thermal phenomena.

Another objective of the present invention is also to provide a lubricating composition having improved FE properties.

Another objective of the present invention is to provide a lubricating composition which makes it possible to reduce the coefficient of friction.

Yet another objective of the present invention is to provide an organomolybdenum compound that is less sensitive to various external chemical or thermal phenomena.

Still other objects will become apparent upon reading the description of the invention that follows here below.

These objectives are fulfilled by the present invention which relates to a molybdenum dinuclear complex with ligands selected from fatty tertiary amines having the formula (I):

in which:
R represents an alkyl, either linear or branched, comprising from 3 to 30 carbon atoms, preferably from 3 to 20, advantageously from 7 to 17 carbon atoms;
n, being identical or different, represents 2 or 3;
$R^2$ and $R^3$, being identical or different, represent a group: O, OR, $NR'_2$, COOR', or COO, where R', being identical or different, represents a hydrogen atom or an alkali metal, or an alkaline earth metal, preferably R' is H, preferably $R^2$ and $R^3$ which are identical or different, represent an OH or $NH_2$ group.

Preferably, the compound having the formula (I) is selected from the following compounds:

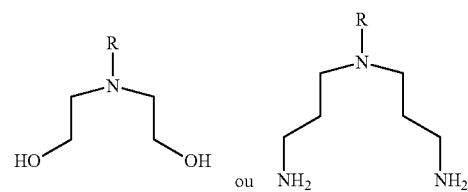

R being as defined above.

The dinuclear complexes according to the present invention are complexes that comprise two molybdenum atoms, each preferably having an octahedral structure, and being complexed with a compound having the formula (I). Thus, the dinuclear complexes of the present invention preferably correspond to the following formula (II):

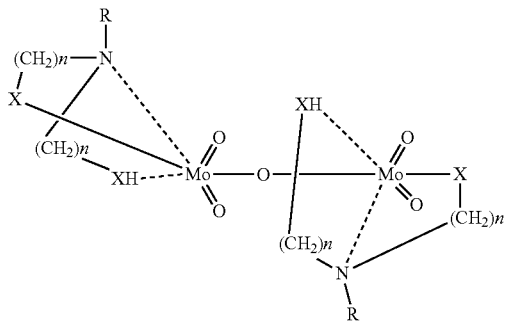

in which R and n are as defined above and each of the (multiple) X, being identical or different, represents O, OR, NR'$_2$, COOR', or COO, where R', being identical or different, represents a hydrogen atom or an alkali metal or an alkaline earth metal; preferably R' is H; preferably X is OH or NH$^2$.

In a particularly advantageous manner, this complex does not contain sulfur.

Without intending to be bound by any theory, the presence of a ligand having the formula (I) makes it possible to stabilize the molybdenum, or indeed even to protect the molybdenum from various external chemical and thermal phenomena, and consequently to promote sulfurization with sulfur compounds present in the lubricant such as zinc dialkyl dithiophosphate (DTPZn) for example.

Without intending to be bound by any theory, the complex according to the invention effectively enables obtaining a low coefficient of friction, an improvement of the FE properties of the lubricant and thereby achieve fuel savings.

The complexes according to the present invention are obtained by means of a method comprising bringing about the reaction between a molybdenum compound and at least one compound having the formula (I).

The molybdenum compound may be MoO$_3$, an inorganic product containing molybdenum such as ammonium molybdate, molybdenum chloride, molybdenum oxychloride, or an organomolybdenum compound which according to the present invention, may be selected from among organic molybdenum complexes comprising at least one molybdenum (Mo) chemical element and at least one ligand such as a carboxylate ligand, an ester ligand, an amide ligand, a dithiophosphate ligand, a dithiocarbamate ligand. The method corresponds to a complexation of molybdenum with the compounds having the formula (I) according to the invention by means of dissolution of an inorganic compound with formation of a complex or by ligand exchange in the event of use of an organomolybdenum compound. For example, the organic complexes of molybdenum with carboxylates, esters, and amides may be obtained by bringing about the reaction of molybdenum oxide or ammonium molybdates with fatty substances, glycerides, fatty acids or derivatives of fatty acids (esters, amines, amides, etc.). Within the meaning and scope of the invention, the carboxylate ligands, the ester ligands and the amide ligands are free of sulfur and phosphorus.

In one embodiment, the organomolybdenum compound of the invention is selected from molybdenum complexes with amide ligands, mainly prepared by bringing about the reaction of a molybdenum source, which may be for example molybdenum trioxide, and an amine derivative, and fatty acids comprising, for example, from 4 to 36 carbon atoms, such as, for example, the fatty acids contained in plant oils or animal oils. The synthesis of such compounds is for example described in the U.S. Pat. No. 4,889,647, EP0546357, U.S. Pat. No. 5,412,130 or EP1770153.

In one preferred embodiment of the invention, the organomolybdenum compound is selected from among organic molybdenum complexes with amide ligands obtained by bringing about the reaction:

(i) of a fatty substance of such type as mono, di or tri glyceride, or fatty acid;

(ii) of an amino source having the formula (A)

In which $X^1$ represents an oxygen atom or a nitrogen atom;

$X^2$ represents an oxygen atom or a nitrogen atom;

n or m represents 1 when $X^1$ or $X^2$ respectively represents an oxygen atom;

n or m represents 2 when $X^1$ or $X^2$ respectively represents a nitrogen atom;

(iii) and a molybdenum source selected from molybdenum trioxide or molybdates, preferably ammonium molybdate.

In one embodiment of the invention, the organomolybdenum compound may comprise from 0.1 to 30% by weight, preferably from 0.1 to 20%, more preferentially from 2 to 8.5% by weight of molybdenum relative to the total weight of the organomolybdenum complex.

Preferably, the organomolybdenum compound comprises at least one organic molybdenum complex having the formula (III), (IV) or (V), alone or in a mixture:

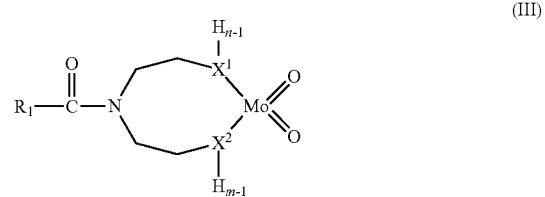

in which:

$X^1$ represents an oxygen atom or a nitrogen atom;

$X^2$ represents an oxygen atom or a nitrogen atom;

n represents 1 when $X^1$ represents an oxygen atom and m represents 1 when $X^2$ represents an oxygen atom;

n represents 2 when $X^1$ represents a nitrogen atom and m represents 2 when $X^2$ represents a nitrogen atom;

$R_1$ represents a linear or branched, saturated or unsaturated, alkyl group comprising from 4 to 36 carbon atoms, preferentially from 4 to 20 carbon atoms, advantageously from 6 to 18 carbon atoms;

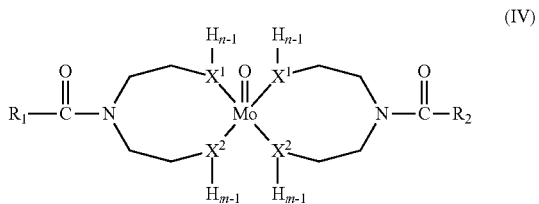

in which:
$X^1$ represents an oxygen atom or a nitrogen atom;
$X^2$ represents an oxygen atom or a nitrogen atom;
n represents 1 when $X^1$ represents an oxygen atom and m represents 1 when $X^2$ represents an oxygen atom;
n represents 2 when $X^1$ represents a nitrogen atom and m represents 2 when $X^2$ represents a nitrogen atom;
$R_1$ represents a linear or branched, saturated or unsaturated, alkyl group comprising from 4 to 36 carbon atoms, preferentially from 4 to 20 carbon atoms, advantageously from 6 to 18 carbon atoms;
$R_2$ represents a linear or branched, saturated or unsaturated, alkyl group comprising from 4 to 36 carbon atoms, preferentially from 4 to 20 carbon atoms, advantageously from 6 to 18 carbon atoms;

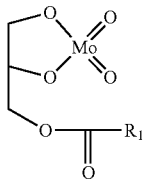

$R_1$ represents a linear or branched, saturated or unsaturated, alkyl group comprising from 4 to 36 carbon atoms, preferentially from 4 to 20 carbon atoms, advantageously from 6 to 18 carbon atoms.

Advantageously, the organic molybdenum complex having the formula (III), (IV) or (V) is prepared by bringing about the reaction:
(i) of a fatty substance of such type as mono, di or tri glyceride, or fatty acid;
(ii) of diethanolamine or 2-(2-aminoethyl) aminoethanol;
(iii) and a molybdenum source selected from molybdenum trioxide or molybdates, preferentially ammonium molybdate.

More advantageously, the organic molybdenum complex having the formula (III) is constituted of at least one compound having the formula (III-a) or (III-b), alone or in a mixture:

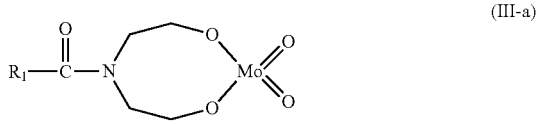

in which $R_1$ represents a linear or branched, saturated or unsaturated, alkyl group comprising from 4 to 36 carbon atoms, preferentially from 4 to 20 carbon atoms, advantageously from 6 to 18 carbon atoms.

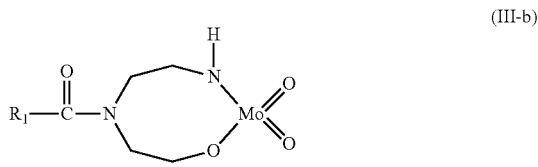

in which $R_1$ represents a linear or branched, saturated or unsaturated, alkyl group comprising from 4 to 36 carbon atoms, preferentially from 4 to 20 carbon atoms, advantageously from 6 to 18 carbon atoms.

As an example of molybdenum compounds that are sulfur-free according to the invention, mention may be made of Molyvan 855® marketed by the company Vanderbilt.

In one other embodiment of the invention, the organomolybdenum compound is selected from among organic molybdenum complexes with dithiophosphate ligands or organic molybdenum complexes with dithiocarbamate ligands.

For the purposes of the invention, the organic molybdenum complexes with dithiophosphate ligands are also known as molybdenum dithiophosphates or Mo-DTP compounds and organic molybdenum complexes with dithiocarbamate ligands are also known as molybdenum dithiocarbamates or Mo-DTC compounds.

In a more preferred embodiment of the invention, the organomolybdenum compound is selected from molybdenum dithiocarbamates.

The Mo-DTC compounds are complexes formed from a metal nucleus of molybdenum bound to one or more ligands, the ligand being an alkyl dithiocarbamate group. These compounds are well known to the person skilled in the art.

In one embodiment of the invention, the Mo-DTC compound may comprise from 1 to 40%, preferably from 2 to 30%, more preferentially from 3 to 28%, advantageously from 4 to 15% by weight of molybdenum, relative to the total weight of the Mo-DTC compound.

In another embodiment of the invention, the Mo-DTC compound may comprise from 1 to 40%, preferably from 2 to 30%, more preferentially from 3 to 28%, advantageously from 4 to 15% by weight of sulfur, relative to the total weight of the Mo-DTC compound.

In another embodiment of the invention, the Mo-DTC compound may be selected from among those wherein the nucleus has two molybdenum atoms (also known as dimeric Mo-DTCs) and those wherein the nucleus has three molybdenum atoms (also known as trimeric Mo-DTCs).

In another embodiment of the invention, the trimeric Mo-DTC compounds correspond to the formula $Mo_3S_kL_n$ in which:
k represents an integer at least equal to 4, preferably ranging from 4 to 10, advantageously from 4 to 7;
n is an integer ranging from 1 to 4, and
L being an alkyl dithiocarbamate group comprising from 1 to 100 carbon atoms, preferably from 1 to 40 carbon atoms, advantageously from 3 to 20 carbon atoms.

By way of examples of trimeric Mo-DTC compounds according to the invention, mention may be made of the compounds and the methods of preparation thereof as described in the documents WO 98/26030 and US 2003/022954.

In one preferred embodiment of the invention, the Mo-DTC compound is a dimeric Mo-DTC compound.

By way of examples of dimeric Mo-DTC compounds, mention may be made of the compounds and the methods of preparation thereof as described in documents EP 0757093, EP 0719851, EP 0743354 or EP 1013749.

The dimeric Mo-DTC compounds generally correspond to the compounds having the formula (VI):

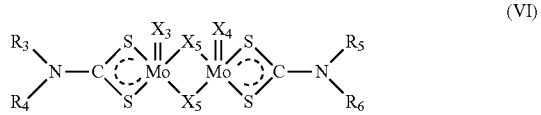

in which:
R$_3$, R$_4$, R$_5$, R$_6$, being identical or different, independently represent a hydrocarbon group selected from among alkyl, alkenyl, aryl, cycloalkyl or cycloalkenyl groups;
X$_3$, X$_4$, X$_5$ and X$_6$, being identical or different, independently represent an oxygen atom or a sulfur atom.

Unless otherwise indicated, the term "alkyl group" within the meaning and scope of the invention, and in particular for R$_3$, R$_4$, R$_5$ and R$_6$ having the formula (VI), is understood to refer to a hydrocarbon group, either linear or branched, saturated or unsaturated, comprising from 1 to 24 carbon atoms, preferably from 4 to 18 carbon atoms.

In one embodiment of the invention, the alkyl group is selected from the group formed by methyl, ethyl, propyl, isopropyl, n-butyl, isobutyl, tert-butyl, n-pentyl, iso-pentyl, neopentyl, hexyl, heptyl, octyl, nonyl, decyl, undecyl, dodecyl, tridecyl, isotridecyl, tetradecyl, hexadecyl, stearyl, icosyl, docosyl, tetracosyl, triacontyl, 2-ethylhexyl, 2-butyloctyl, 2-butyldecyl, 2-hexyloctyl, 2-hexyldecyl, 2-octyldecyl, 2-hexyldodecyl, 2-octyldodecyl, 2-decyltetradecyl, 2-dodecylhexadecyl, 2-hexadecyloctadecyl, 2-tetradecyloctadecyl, myristyl, palmityl and stearyl.

The term "alkenyl group" within the meaning and scope of the present invention is understood to refer to a linear or branched hydrocarbon group comprising at least one double bond and comprising from 2 to 24 carbon atoms. The alkenyl group may be selected from among vinyl, allyl, propenyl, butenyl, isobutenyl, pentenyl, isopentenyl, hexenyl, heptenyl, octenyl, nonenyl, decenyl, undecenyl, dodecenyl, tetradecenyl and oleic.

Within the meaning and scope of the present invention, the term "aryl group" is understood to refer to a polycyclic aromatic hydrocarbon or an aromatic group, whether or not substituted by an alkyl group. The aryl group may contain from 6 to 24 carbon atoms.

In one embodiment, the aryl group may be selected from among the group formed by phenyl, toluyl, xylyl, cumenyl, mesityl, benzyl, phenethyl, styryl, cinnamyl, benzhydryl, trityl, ethylphenyl, propylphenyl, butylphenyl, pentylphenyl, hexylphenyl, heptylphenyl, octylphenyl, nonylphenyl, decylphenyl, undecylphenyl, dodecylphenyl, phenylphenyl, benzylphenyl, phenyl-styrene, p-cumylphenyl and naphthyl.

Within the meaning and scope of the present invention, the term "cycloalkyl group" is understood to refer to a polycyclic or cyclic hydrocarbon, whether or not substituted by an alkyl group.

Within the meaning and scope of the present invention, the term "cycloalkenyl group" is understood to refer to a polycyclic or cyclic hydrocarbon, whether or not substituted by an alkyl group, and comprising at least one unsaturation.

The cycloalkyl groups and the cycloalkenyl groups may comprise from 3 to 24 carbon atoms.

Within the meaning and scope of the present invention, the cycloalkyl groups and the cycloalkenyl groups may be selected, in a nonlimiting manner, from the group constituted of cyclopentyl, cyclohexyl, cycloheptyl, methylcyclopentyl, methylcyclohexyl, methylcycloheptyl, cyclopentenyl, cyclohexenyl, cycloheptenyl, methylcyclopentenyl, methylcyclohexenyl.

In one preferred embodiment of the invention, R$_3$, R$_4$, R$_5$ and R$_6$ having the formula (VI), being identical or different, independently represent an alkyl group comprising from 1 to 24 carbon atoms, preferably from 4 to 18 carbon atoms, or an alkenyl group comprising from 2 to 24 carbon atoms.

In one embodiment of the invention, X$_3$, X$_4$, X$_5$ and X$_6$ may be identical and may represent a sulfur atom.

In one other embodiment of the invention, X$_3$, X$_4$, X$_5$ and X$_6$ may be identical and may be an oxygen atom.

In one other embodiment of the invention, X$^3$ and X$_4$ may represent a sulfur atom, and X$_5$ and X$_6$ may represent an oxygen atom.

In one other embodiment of the invention, X$_3$ and X$_4$ may represent an oxygen atom, and X$_5$ and X$_6$ may represent a sulfur atom.

In one other embodiment of the invention, the ratio of the number of sulfur atoms to the number of oxygen atoms (S/O) of the Mo-DTC compound can vary from (1/3) to (3/1).

In one other embodiment of the invention, the Mo-DTC compound having the formula (VI) may be selected from a symmetrical Mo-DTC compound, an asymmetrical Mo-DTC compound and a combination thereof.

The term "symmetrical Mo-DTC compound" according to the invention is understood to refer to an Mo-DTC compound having the formula (VI) in which the groups R$_3$, R$_4$, R$_5$ and R$_6$ are identical.

The term "asymmetrical Mo-DTC compound" according to the invention is understood to refer to an Mo-DTC compound having the formula (VI) in which the R$_3$ and R$_4$ groups are identical, the R$_5$ and R$_6$ groups are identical, and the R$_3$ and R$_4$ groups are different from the R$_5$ and R$_6$ groups.

In one preferred embodiment of the invention, the Mo-DTC compound is a mixture of at least one symmetrical Mo-DTC compound and at least one asymmetrical Mo-DTC compound.

In one embodiment of the invention, R$_3$ and R$_4$ having the formula (VI), which are identical, represent an alkyl group comprising from 5 to 15 carbon atoms, preferably from 8 to 13 carbon atoms, and R$_5$ and R$_6$ having the formula (VI), which are identical, represent an alkyl group comprising from 5 to 15 carbon atoms, preferably from 8 to 13 carbon atoms, and the groups R$_3$ and R$_4$ having the formula (VI), are identical or different from the groups R$_5$ and R$_6$ having the formula (VI).

In another preferred embodiment of the invention, R$^3$ and R$_4$ having the formula (VI), which are identical, represent an alkyl group comprising from 6 to 10 carbon atoms, and R$_5$ and R$_6$ having the formula (VI), which are identical, represent an alkyl group comprising from 10 to 15 carbon atoms, and the groups R$^3$ and R$_4$ having the formula (VI) are different from the groups R$_5$ and R$_6$ having the formula (VI).

In one other preferred embodiment of the invention, R$^3$ and R$_4$ having the formula (VI), which are identical, represent an alkyl group comprising from 10 to 15 carbon atoms, and R$_5$ and R$_6$ having the formula (VI), which are identical, represent an alkyl group comprising from 6 to 10 carbon atoms, and the groups R$^3$ and R$_4$ having the formula (VI) are different from the groups R$_5$ and R$_6$ having the formula (VI).

In one other preferred embodiment of the invention, $R_3$, $R_4$, $R_5$ and $R_6$, which are identical, represent an alkyl group comprising from 5 to 15 carbon atoms, preferably from 8 to 13 carbon atoms.

In an advantageous manner, the Mo-DTC compound is selected from among the compounds having the formula (V) in which:
- $X_3$ and $X_4$ represent an oxygen atom;
- $X_5$ and $X_6$ represent a sulfur atom;
- $R_3$ having the formula (VI) represents an alkyl group comprising 8 carbon atoms or an alkyl group comprising 13 carbon atoms;
- $R_4$ having the formula (VI) represents an alkyl group comprising 8 carbon atoms or an alkyl group comprising 13 carbon atoms;
- $R_5$ having the formula (VI) represents an alkyl group comprising 8 carbon atoms or an alkyl group comprising 13 carbon atoms;
- $R_6$ having the formula (VI) represents an alkyl group comprising 8 carbon atoms or an alkyl group comprising 13 carbon atoms.

Thus, in an advantageous manner, the Mo-DTC compound is selected from among the compounds having the formula (VI-a)

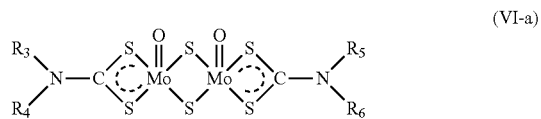

(VI-a)

in which the groups $R_3$, $R_4$, $R_5$ and $R_6$ are as defined for the formula (V).

in a more advantageous manner, the Mo-DTC compound is a mixture:
- of an Mo-DTC compound having the formula (VI-a) in which $R_3$, $R_4$, $R_5$ and $R_6$ represent an alkyl group comprising 8 carbon atoms;
- of an Mo-DTC compound having the formula (VI-a) in which $R_3$, $R_4$, $R_5$ and $R_6$ represent an alkyl group comprising 13 carbon atoms, and/or
- of an Mo-DTC compound having the formula (VI-a) in which $R^3$, $R_4$ represent an alkyl group comprising 8 carbon atoms and $R_5$ and $R_6$ represent an alkyl group comprising 13 carbon atoms.

By way of examples of Mo-DTC compounds, mention may be made of the products Molyvan L®, Molyvan 807®, or Molyvan 822® marketed by the firm R. T Vanderbilt Company®, or the products Sakura-lube 200®, Sakura-lube 165®, Sakura-lube 525® or Sakura-lube 600® marketed by the company Adeka.

Preferably, the molybdenum complex preparation method for preparing the dinuclear complex according to the invention is carried out at a temperature of between 0° C. and 250° C., preferably between 20 and 150° C., preferably at ambient temperature, for example between 15 and 30° C.

Preferably, the N/Mo atomic ratio in the mixture of the method of the invention is between 1 and 50, preferably between 2 and 10.

Preferably the method is carried out in the presence of water. Without intending to be bound by any theory, water in an advantageous manner, will play a role as catalyst.

Preferably, the molar ratio between water and the compound having the formula (I) is comprised between 0.5 and 10.

The present invention also relates to a lubricating composition comprising:
- at least one base oil;
- at least one dinuclear molybdenum complex according to the invention.

Preferably, the lubricating composition according to the invention comprises from 0.001 to 0.1% by weight of dinuclear molybdenum complex according to the invention, relative to the total weight of the composition.

In a general manner, the lubricating composition according to the invention may comprise any type of mineral, synthetic or natural, animal or plant lubricating base oil known to the person skilled in the art.

The base oils used in the lubricating compositions according to the invention may be oils of mineral or synthetic origins belonging to groups I to V according to the classes defined in the American Petroleum Institute (API) classification (or equivalents thereof according to the ATIEL (Technical Association of the European Lubricants Industry) classification) (Table 1) or the mixtures thereof.

TABLE 1

| | Saturates content | Sulfur content | Viscosity index (VI) |
|---|---|---|---|
| Group 1 Mineral oils | <90% | >0.03% | 80 ≤ VI < 120 |
| Group II Hydrocracked oils | ≥90% | ≤0.03% | 80 ≤ VI < 120 |
| Group III Hydrocracked or hydroisomerized oils | ≥90% | ≤0.03% | ≥120 |
| Group IV | Poly-alpha-olefins (PAO) | | |
| Group V | Esters and other bases not included in groups I to IV | | |

The mineral base oils according to the invention include all types of base oils obtained by atmospheric and vacuum distillation of crude oil, followed by refining operations such as solvent extraction, deasphalting, solvent dewaxing, hydrotreatment, hydrocracking, hydrodimerization.

Mixtures of synthetic and mineral oils may also be used.

There is generally no limitation as to the use of different lubricating bases in order to produce the lubricating compositions according to the invention, except that they should have properties—in particular in respect of viscosity, viscosity index, sulfur content, resistance to oxidation—that are suitable for use in engines or for vehicle transmissions.

The base oils of the lubricating compositions according to the invention may also be selected from among synthetic oils, such as certain esters of carboxylic acids and alcohols, and from polyalphaolefins. The polyalphaolefins used as base oils are for example obtained from monomers comprising from 4 to 32 carbon atoms, for example from decene, octene or dodecene, and of which the viscosity at 100° C. is between 1.5 and 15 $mm^2 \cdot s^1$ according to the standard ASTM D445 [from ASTM International, formerly American Society for Testing and Materials). Their average molecular weight is generally between 250 and 3000 according to the standard ASTM D5296.

In a preferred manner, the base oils of the present invention are selected from the above base oils wherein the aromatics content is between 0 and 45%, preferably between 0 and 30%. The aromatics content of oils is measured according to the Burdett UV method. Without intending to be bound by any theory, the aromaticity of the base oil is a characteristic that serves to optimize the functioning of the polymer as a function of temperature. The choice of an aromatic-lean oil makes possible an optimum at a higher temperature.

In an advantageous manner, the lubricating composition according to the invention comprises at least 50% by weight of base oils relative to the total weight of the composition.

In a more advantageous manner, the lubricating composition according to the invention comprises at least 60% by weight, or even at least 70% by weight, of base oils relative to the total weight of the composition.

In a particularly more advantageous manner, the lubricating composition according to the invention comprises from 60 to 99.5% by weight of base oils, preferably from 70 to 99.5% by weight of base oils, relative to the total weight of the composition.

Many additional additives may be used for this lubricating composition according to the invention.

The preferred additional additives for the lubricating composition according to the invention are selected from among detergent additives, anti-wear additives, friction modifying additives other than organomolybdenum compounds, extreme pressure additives, dispersants, pour point improvers, anti-foaming agents, thickeners and mixtures thereof.

In a preferred manner, the lubricating composition according to the invention comprises at least one anti-wear additive, at least one extreme pressure additive or mixtures thereof.

The anti-wear additives and extreme pressure additives protect surfaces in frictional contact by forming a protective film that is adsorbed on these surfaces.

There exists a wide variety of anti-wear additives. In a preferred manner, for the lubricating composition according to the invention, the anti-wear additives are selected from sulfur-phosphorus additives such as metal alkylthiophosphates, in particular zinc alkylthiophosphates, and more specifically zinc dialkyldithiophosphates or ZnDTP. The preferred compounds are those having the formula $Zn((SP(S)(OR^1)(OR^2))_2$, in which $R^1$ and $R^2$, being identical or different, independently represent an alkyl group, preferentially an alkyl group comprising from 1 to 18 carbon atoms.

Amine phosphates are also anti-wear additives that may be used in the lubricating composition according to the invention. However, the phosphorus provided by these additives can act as a poison for catalytic systems in automobiles because these additives are ash-generating. These effects can be minimized by partially substituting the amino phosphates with additives which do not provide phosphorus, such as, for example, polysulfides, in particular sulfur-containing olefins.

In an advantageous manner, the lubricating composition according to the invention may comprise from 0.01 to 6% by weight, preferably from 0.05 to 4% by weight, more preferentially from 0.1 to 2% by weight, relative to the total weight of the lubricating composition, anti-wear additives and extreme pressure additives.

In an advantageous manner, the lubricating composition according to the invention may comprise at least one additional friction modifier additive other than the organomolybdenum compounds. The additional friction modifier additive may be selected from a compound providing metallic elements and an ash-free compound. Among the compounds providing metallic elements, mention may be made of complexes of transition metals such as Sb, Sn, Fe, Cu, Zn, whereof the ligands may be hydrocarbon compounds comprising atoms of oxygen, nitrogen, sulfur or phosphorus. The ash-free, friction modifier additives are generally of organic origin and may be selected from among monoesters of fatty acids and polyols, fatty epoxides, borate fatty epoxides; or fatty acid glycerol esters. According to the invention, the fatty compounds comprise at least one hydrocarbon group comprising from 10 to 24 carbon atoms.

In an advantageous manner, the lubricating composition according to the invention may comprise at least one antioxidant additive.

The antioxidant additive generally makes it possible to delay the degradation of the lubricating composition in use. This degradation in particular may be reflected in the resulting formation of deposits, in the presence of sludge or slurry, or in an increase in the viscosity of the lubricating composition.

Antioxidant additives act in particular as radical inhibitors or hydroperoxide destroyers. Among the antioxidant additives commonly used, mention may be made of various types such as phenolic antioxidant additives, amine antioxidant additives, and sulfur-phosphorus antioxidant additives. Some of these antioxidant additives, for example sulfur-phosphorus antioxidant additives, can be ash-generating. The phenolic antioxidant additives may be ash-free or indeed even be in the form of basic or neutral metal salts. The antioxidant additives in particular may be selected from among sterically hindered phenols, sterically hindered phenolic esters and sterically hindered phenols comprising a thioether bridge, diphenylamines, diphenylamines substituted with at least one $C_1$-$C_{12}$ alkyl group, N,N'-dialkyl-aryl-diamines and mixtures thereof.

Preferably according to the invention, the sterically hindered phenols are selected from compounds comprising a phenol group of which at least one vicinal carbon of the carbon bearing the alcohol functional group is substituted by at least one $C_1$-$C_{10}$ alkyl group, preferably a $C_1$-$C_6$ alkyl group, preferably a $C_4$ alkyl group, preferably by the tert-butyl group.

Amino compounds are another class of antioxidant additives that may be used, possibly in combination with phenolic antioxidant additives. Examples of amino compounds are aromatic amines, for example aromatic amines having the formula $NR^7R^8R^9$ in which $R^7$ represents an aliphatic group or an aromatic group, optionally substituted, $R^8$ represents an aromatic group, optionally substituted, $R^9$ represents a hydrogen atom, an alkyl group, an aryl group, or a group of having the formula $R^{10}S(O)_zR^{11}$ in which $R^{10}$ represents an alkylene group or an alkenylene group, $R^{11}$ represents an alkyl group, an alkenyl group, or an aryl group, and z represents 0, 1 or 2.

Sulfurized alkyl phenols or the alkali and alkaline earth metal salts thereof may also be used as antioxidant additives.

The lubricating composition according to the invention may contain all types of antioxidant additives known to the person skilled in the art.

In an advantageous manner, the lubricating composition comprises at least one ash free antioxidant additive.

In an equally advantageous manner, the lubricating composition according to the invention comprises from 0.5 to 2% by weight, relative to the total weight of the composition, of at least one antioxidant additive.

The lubricating composition according to the invention may also comprise at least one detergent additive.

Detergent additives generally serve to reduce the formation of varnish on the surface of metal parts by dissolving the by-products of oxidation and combustion.

The detergent additives that may be used in the lubricating composition according to the invention are generally known to the person skilled in the art. The detergent additives may be anionic compounds comprising a long lipophilic hydrocarbon chain and a hydrophilic head. The associated cation may be a metal cation of an alkali metal, or an alkaline earth metal.

The detergent additives are preferentially selected from among alkali metal or alkaline earth metal salts of carboxylic acids, sulphonates, salicylates, naphthenates, as well as salts of phenates. The alkali metals and alkaline earth metals are preferentially calcium, magnesium, sodium or barium.

These metal salts generally comprise the metal in a stoichiometric quantity or else indeed in excess, therefore in an amount greater than the stoichiometric quantity. These are thus then overbased detergent additives; the excess metal that contributes the overbased character to the detergent additive is then generally in the form of a metal salt that is insoluble in oil, for example a carbonate, a hydroxide, an oxalate, an acetate, a glutamate, preferentially a carbonate.

In an advantageous manner, the lubricating composition according to the invention may comprise from 2 to 4% by weight of detergent additive relative to the total weight of the lubricating composition.

In an equally advantageous manner, the lubricating composition according to the invention may also comprise at least one pour point depressant additive.

By slowing the formation of paraffin crystals, the pour point depressant additives generally improve the low-temperature behavior of the lubricating composition according to the invention.

By way of examples of pour point depressant additives, mention may be made of polyalkyl methacrylates, polyacrylates, polyarylamides, polyalkylphenols, polyalkylnaphthalenes, alkylated polystyrenes.

In an advantageous manner, the lubricating composition according to the invention may also comprise at least one dispersing agent.

The dispersing agent may be selected from among Mannich bases, succinimides and derivatives thereof.

In an equally advantageous manner, the lubricating composition according to the invention may comprise from 0.2 to 10% by weight of dispersing agent relative to the total weight of the lubricating composition.

The lubricating composition of the present invention may also include at least one additional polymer that improves the viscosity index. By way of examples of additional polymers that improve the viscosity index, mention may be made of polymer esters, homopolymers or copolymers, either hydrogenated or non-hydrogenated, of styrene, butadiene and isoprene, polymethacrylates (PMA).

The lubricating composition according to the invention preferably comprises in addition at least one anti-wear additive, for example ZnDTP (zinc dithiophosphate).

The present invention also relates to a lubrication method for lubricating an engine, in particular an internal combustion engine, the method including the lubrication of component parts of the engine with the lubricating composition of the invention.

The present invention also relates to the use of a compound having the formula (I) for protecting molybdenum, from degradation thereof in the lubricating composition, in particular for stabilizing the molybdenum.

The present invention also relates to the use of the dinuclear molybdenum complex according to the invention in a lubricating composition comprising at least one base oil, for enhancing the Fuel Eco properties of the lubricating composition and maintaining them over time. Preferably, the dinuclear molybdenum complex according to the invention is used in implementation in an amount ranging from 100 ppm to 1000 ppm molybdenum, preferably 400 to 800 ppm molybdenum, by weight relative to the total weight of the lubricating composition.

The present invention also relates to a molybdenum protection method, in particular by means of hydrolysis, for protecting the molybdenum in a lubricating composition comprising at least one base oil, from degradation, the method comprising of the complexation of the said molybdenum in the form of a dinuclear complex with at least one compound having the formula (I) according to the invention.

The present invention also relates to a Fuel Eco enhancing method for enhancing the Fuel Eco properties of a lubricating composition comprising at least one base oil, the method comprising of the addition, in the said lubricating composition, of a dinuclear complex according to invention. Preferably, the dinuclear molybdenum complex according to the invention is used in implementation in an amount ranging from 100 ppm to 1000 ppm molybdenum, preferably from 400 to 800 ppm molybdenum, by weight relative to the total weight of the lubricating composition.

Thus, and in a particularly advantageous manner, the use in implementation of the dinuclear molybdenum complex according to the invention makes possible the prolongation over time of the properties of the organomolybdenum compound, in particular as a lubricating agent, preferably as a friction modifier.

In a particularly advantageous manner, the compositions of the invention comprising the complex of the invention exhibit a low coefficient of friction which is maintained over time.

The particular, advantageous or preferred characteristic features of the combined use according to the invention define the particular, advantageous or preferred combinations that may be used according to the invention.

BRIEF DESCRIPTION OF THE DRAWING

FIG. 1 provides the molbdenum content for compositions according to the invention and for comparative compositions after 1 month.

DETAILED DESCRIPTION

The present application will be described here below with the aid of non-limiting examples.

Example 1: Preparation of Dinuclear Molybdenum Complexes

The dinuclear molybdenum complexes are obtained by mixing MoO3 with the following amines at ambient temperature for a period of 2 weeks. The weight of amine used in implementation is equal to 3×(0.5/n) %, with n corresponding to the number of nitrogen in the molecule.

TABLE 2

| | |
|---|---|
| Example 1.1 (comparative) | Duomeen CD (N-Coco-1,3-diaminopropane. N-cocoalkyl-1,3-diaminopropane) |
| Example 1.2 (comparative) | Triameen T (N-tallow alkyldipropylene triamine) |
| Example 1.3 (invention) | Stearyldiethanolamine |
| Example 1.4 (invention) | Triameen YT (N tallow alkyl dipropylene branched triamine) |

The lubricating compositions are then produced from each of the complexes obtained by mixing a base oil of the type Poly-alpha-olefin (PAO), with the complex (in a manner so as to have 400 ppm of Mo in the lubricating composition) and 1% by weight of ZnDTP. The mixture is heated for 30 min at 60° C.

Example 2: Impact of the Ligand on the Stability of Molybdenum

The lubricating compositions obtained in Example 1 were stored over a period of several months in order to assess their stability.

The quantity of Mo was measured after 1 month, the results are provided in FIG. 1 which clearly shows the stability of the compositions of the invention as compared to the comparative compositions.

Example 3: Study of the Coefficient of Friction as a Function of Time

The tests were carried out, for each of the compositions of Example 1, on a tribometer with a ball (Ø12 mm)-plane contact, both made of 10006 steel. The conditions used for these tests are as follows: a normal load of 7N, which corresponds to a maximum contact pressure of 540 MPa, a temperature of 110° C., a speed of 5 Hz, an amplitude of 5 mm. 5 A/R cycles are performed in 1 s, which corresponds to 18,000 cycles per hour.

The results of the coefficient of friction for 10,000 cycles are as follows:
Example 1.1:0.045
Example 1.2:0.045
Example 1.3:0.04
Example 1.4:0.03

These results show a reduction in the coefficient of friction by the compositions of the invention. This low coefficient of friction is maintained over time.

The invention claimed is:

1. A molybdenum dinuclear complex with ligands selected from fatty tertiary amines having the formula (I):

in which:
R represents an alkyl, either linear or branched, comprising from 3 to 30 carbon atoms;
n, being identical or different, represents 2 or 3;
$R^2$ and $R^3$, being identical or different, represent a group: O, OR, $NR'_2$, COOR', or COO, where R', being identical or different, represents a hydrogen atom or an alkali metal, or an alkaline earth metal.

2. The complex according to claim 1, in which the compound having the formula (I) is selected from the following compounds:

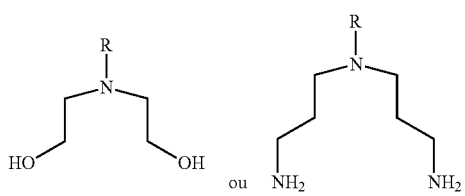

R being as defined in claim 1.

3. The complex according to claim 1 that corresponds to the formula (II):

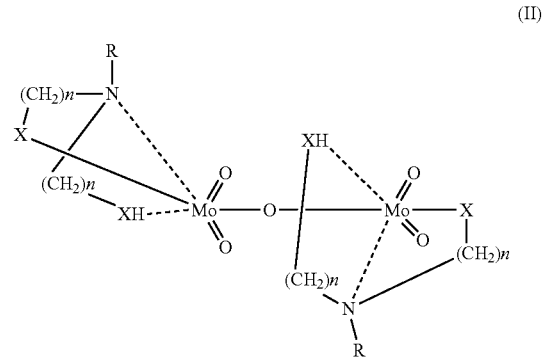

in which R and n are as defined above and each of the (multiple) X, being identical or different, represents O, OR, $NR'_2$, COOR', or COO, where R', being identical or different, represents a hydrogen atom or an alkali metal or an alkaline earth metal.

4. The molybdenum complex preparation method for preparing a complex according to claim 1 comprising the mixing of a molybdenum compound and a compound having the formula (I).

5. A lubricating composition comprising:
at least one base oil;
at least one dinuclear molybdenum complex according to claim 1.

6. The lubricating composition according to claim 5 that further comprises at least one anti-wear additive.

7. A lubricating composition according to claim 5 comprising from 0.001 to 0.1% by weight of the dinuclear molybdenum complex, relative to the total weight of the composition.

8. A method for lowering the coefficient of friction of a lubricating composition, the method including lowering the coefficient of friction with a complex according to claim 1 in the lubricating composition which further comprises at least one base oil.

9. A method for stabilizing the molybdenum in a lubricating composition, the method comprising the use of a compound having the formula (I)

in which:
R represents an alkyl, either linear or branched, comprising from 3 to 30 carbon atoms;
n, being identical or different, represents 2 or 3;
$R^2$ and $R^3$, being identical or different, represent a group: O, OR, $NR'_2$, COOR', or COO, where R', being identical or different, represents a hydrogen atom or an alkali metal, or an alkaline earth metal.

10. A lubrication method for lubricating an engine, the method including the lubrication of component parts of the engine with the composition according to claim 5.

11. A molybdenum protection method, for protecting the molybdenum in a lubricating composition comprising at least one base oil, from degradation, the method comprising of the complexation of the molybdenum in the form of a dinuclear complex with at least one compound having the formula (I):

in which:
R represents an alkyl, either linear or branched, comprising from 3 to 30 carbon atoms;
n, being identical or different, represents 2 or 3;
$R^2$ and $R^3$, being identical or different, represent a group: O, OR, $NR'_2$, COOR', or COO, where R', being identical or different, represents a hydrogen atom or an alkali metal, or an alkaline earth metal.

12. A Fuel Eco enhancing method for enhancing the Fuel Eco properties of a lubricating composition comprising at least one base oil, the method comprising of the addition, in the said lubricating composition, of a dinuclear complex according to claim 1.

13. The method according to claim 12, wherein the dinuclear molybdenum complex is used in an amount ranging from 100 ppm to 1000 ppm molybdenum, by weight relative to the total weight of the lubricating composition.

14. The complex according to claim 1, wherein R represents an alkyl, either linear or branched, comprising from 3 to 20 carbon atoms.

15. The complex according to claim 1, wherein R represents an alkyl, either linear or branched, comprising from 7 to 17 carbon atoms.

16. The complex according to claim 1, wherein $R^2$ and $R^3$ which are identical or different, represent an OH or $NH_2$ group.

17. The method according to claim 8, for maintaining a low coefficient fraction over time.

18. The method according to claim 12, wherein the dinuclear molybdenum complex is used in an amount ranging from 400 ppm to 800 ppm molybdenum.

* * * * *